(12) United States Patent
Chaddha

(10) Patent No.: US 6,728,775 B1
(45) Date of Patent: Apr. 27, 2004

(54) MULTIPLE MULTICASTING OF MULTIMEDIA STREAMS

(75) Inventor: Navin Chaddha, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 1077 days.

(21) Appl. No.: 08/855,246

(22) Filed: May 13, 1997

Related U.S. Application Data

(63) Continuation-in-part of application No. 08/714,447, filed on Mar. 17, 1997.

(51) Int. Cl.⁷ .............................................. G06F 15/16
(52) U.S. Cl. ........................ 709/231; 709/229; 709/232
(58) Field of Search ...................... 395/200.61, 200.59, 395/200.62; 709/231, 232, 229

(56) References Cited

U.S. PATENT DOCUMENTS

| | | | | |
|---|---|---|---|---|
| 4,816,914 A | | 3/1989 | Ericsson | |
| 5,144,425 A | | 9/1992 | Joseph | 358/133 |
| 5,194,950 A | | 3/1993 | Murakami et al. | |
| 5,231,599 A | | 7/1993 | Peters et al. | |
| 5,235,419 A | | 8/1993 | Krause | |
| 5,331,637 A | * | 7/1994 | Francis et al. | 370/54 |
| 5,349,383 A | * | 9/1994 | Parke et al. | 348/397 |
| 5,367,385 A | | 11/1994 | Yuan | |
| 5,396,497 A | | 3/1995 | Veltman | |
| 5,418,568 A | | 5/1995 | Keith | 348/390 |
| 5,418,571 A | * | 5/1995 | Ghanbari | 348/416 |
| 5,426,462 A | | 6/1995 | Bui | |
| 5,481,543 A | | 1/1996 | Veltman | |
| 5,487,167 A | | 1/1996 | Dinallo et al. | |
| 5,502,727 A | | 3/1996 | Catanzaro et al. | |
| 5,510,834 A | | 4/1996 | Weiss et al. | |
| 5,512,938 A | | 4/1996 | Ohno | |
| 5,517,494 A | * | 5/1996 | Green | 370/60 |
| 5,521,630 A | * | 5/1996 | Chen et al. | 348/7 |
| 5,521,918 A | | 5/1996 | Kim | |
| 5,530,484 A | | 6/1996 | Bhatt et al. | |
| 5,557,749 A | | 9/1996 | Norris | |
| 5,560,038 A | | 9/1996 | Haddock | 395/800 |

(List continued on next page.)

OTHER PUBLICATIONS

Amir, E., et al., "An Application Level Video Gateway", ACM Multimedia, pp. 1–10, (Nov. 1995).

(List continued on next page.)

*Primary Examiner*—Saleh Najjar
(74) *Attorney, Agent, or Firm*—Lee & Hayes, PLLC

(57) ABSTRACT

A method of interactively providing a number of client computers with a dynamically selectable and scalable range of multimedia data over a diverse computer network including local area networks (LANs) wide area networks (WANs) such as the internet. Multimedia data is provided by a server to the client computers includes a base layer and one or more enhancement layers. Enhancement layers can be spatial and/or temporal in nature. Depending on the implementation, the server may also provide information about the multimedia data to the client computers. The server splits the multimedia data for streaming via multiple multicast group (MMG) addresses. Information about the portion of the multimedia data carried by each MMG is broadcasted to the client computers. Armed with the information about the multimedia data, client computers can intelligently join and leave MMGs as needed. In some embodiments, the client computers provide feedback about the usage and/or need for the multimedia data, enabling the server to right-size, e.g., grow and/or prune, the multimedia data for network efficiency. With right sizing, the content of the base layer may be increased or decreased with the corresponding growing and pruning of the enhancement layers. Enhancement layers may also be grown and/or pruned independently of the base layer, i.e., without a corresponding change in the base layer.

45 Claims, 15 Drawing Sheets

U.S. PATENT DOCUMENTS

| | | | |
|---|---|---|---|
| 5,574,911 A | * 11/1996 | D'Angelo et al. | 395/601 |
| 5,577,258 A | 11/1996 | Cruz et al. | |
| 5,583,652 A | 12/1996 | Ware | |
| 5,585,852 A | 12/1996 | Agarwal | 348/398 |
| 5,592,228 A | 1/1997 | Dachiku et al. | |
| 5,594,911 A | 1/1997 | Cruz et al. | |
| 5,596,493 A | 1/1997 | Tone et al. | |
| 5,604,867 A | 2/1997 | Harwood | 395/200.13 |
| 5,621,660 A | * 4/1997 | Chaddha et al. | 364/514 |
| 5,649,030 A | 7/1997 | Normile et al. | |
| 5,664,044 A | 9/1997 | Ware | |
| 5,673,265 A | 9/1997 | Gupta et al. | 370/432 |
| 5,694,173 A | 12/1997 | Kimura et al. | 348/423 |
| 5,708,473 A | 1/1998 | Mead | |
| 5,731,840 A | 3/1998 | Kikuchi et al. | |
| 5,742,343 A | 4/1998 | Haskell et al. | |
| 5,745,379 A | * 4/1998 | Lewis | 395/200.77 |
| 5,757,306 A | 5/1998 | Nomura | |
| 5,758,194 A | 5/1998 | Kuzma | |
| 5,768,533 A | 6/1998 | Ran | |
| 5,768,535 A | * 6/1998 | Chaddha et al. | 395/200.77 |
| 5,784,572 A | 7/1998 | Rostoker et al. | |
| 5,796,434 A | 8/1998 | Lempel | |
| 5,832,229 A | * 11/1998 | Tomoda et al. | 395/200.57 |
| 5,844,613 A | 12/1998 | Chaddha | |
| 5,852,565 A | 12/1998 | Demos | |
| 5,859,667 A | 1/1999 | Kondo et al. | |
| 5,864,366 A | * 1/1999 | Yeo | 348/409 |
| 5,874,986 A | * 2/1999 | Gibbon et al. | 348/13 |
| 5,884,004 A | 3/1999 | Sato et al. | |
| 5,886,733 A | * 3/1999 | Zdepski et al. | 348/13 |
| 5,898,686 A | 4/1999 | Virgile | |
| 5,946,316 A | 8/1999 | Chen et al. | |
| 6,084,908 A | 7/2000 | Chiang et al. | |
| 6,157,656 A | 12/2000 | Lindgren et al. | |
| 6,160,846 A | 12/2000 | Chiang et al. | |
| 6,233,017 B1 | 5/2001 | Chaddha | |
| 6,337,881 B1 | 1/2002 | Chaddha | |
| 6,564,262 B1 | 5/2003 | Chaddha | |

OTHER PUBLICATIONS

Chaddha, N., et al., "An end to end software only scalable video delivery system", *Proceedings Networks and Operating System Support for Digital Audio and Video*, pp. 130–141, (Apr. 21, 1995).

McCanne, S., et al., "vic: A Flexible Framework for Packet Video", *ACM Multimedia*, pp. 1–12, (Nov. 1995).

Hung, Andy C. et al., "Error Resilient Pyramid Vector Quantizaton for Image Compression," Proceedings of 1st Int'l. Conference on Image Processing, IEEE Signal Process. Soc. vol. 1 Austin, TX, USA, Nov. 13–16, 1994, pp. 583–587.

Bolot, Jean–Chrysostome, et al., "Scalable Feedback Control for Multicast Video Distribution in the Internet," SIGCOMM 94–Aug. 1994 London, England UK, copyright 1994 ACM, pp. 58–67.

Moura, Jose M.F. et al., "Retrieving quality video across heterogeneous networks –Video over Wireless," IEEE Personal Communications, Feb. 1996, pp. 44–54.

Birney, Keith A., et al., "On the Modeling of DCT and Subband Image Data for Compression," IEEE Transactions on Image Processing, vol. 4, No. 2, Feb. 1995, pp. 186–193.

Crutcher, Laurence, "The Networked Video Jukebox," IEEE Trans. Circuits Syst. Video Technol. (USA), vol. 4, No. 2, pp. 105–120.

Neogi, Raja, "Embedded Real–Time Video Decompression Algorithm and Architecture for HDTV Applications," ICAPP 95, IEEE First ICA/sub 3/PP IEEE 1st Int'l. Conference on Algorithms & Architectures for Parallel Processing (95TH0682–5), pp. 414–21, vol. 1, 1995.

"Quadtree Based Adaptive Lossy Coding of Motion Vectors".

"A Frame–work for Live Multicast Video Streams over the Internet".

"Predictive Hierarchical Table–Lookup Vector Quantization with Quadtree Encoding".

Yavatkar et al., "Optimistic strategies for large–scale dissemination of multimedia information," Proceeding of the conference on Multimedia '93, 1993, pp. 13–20.

* cited by examiner

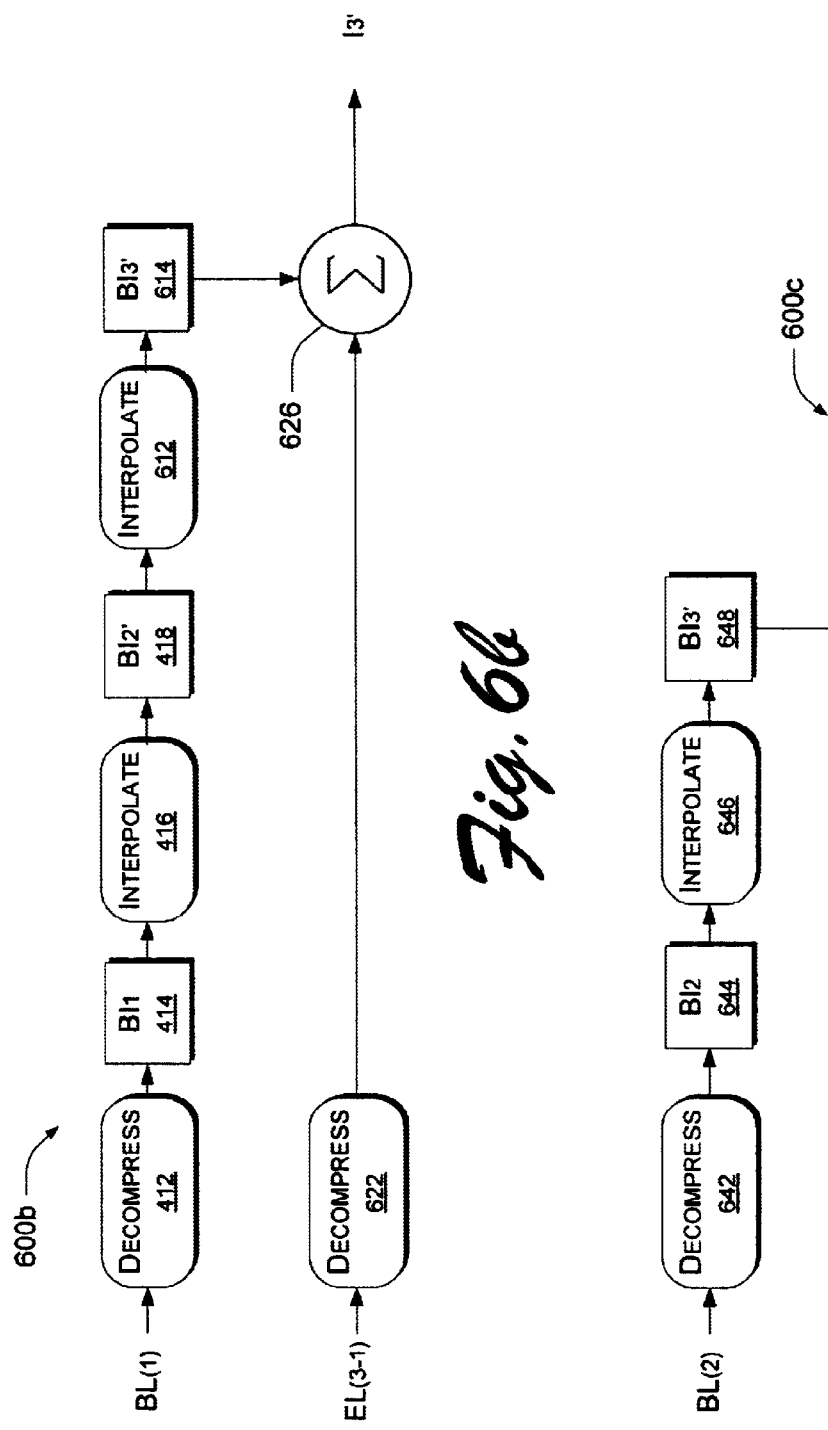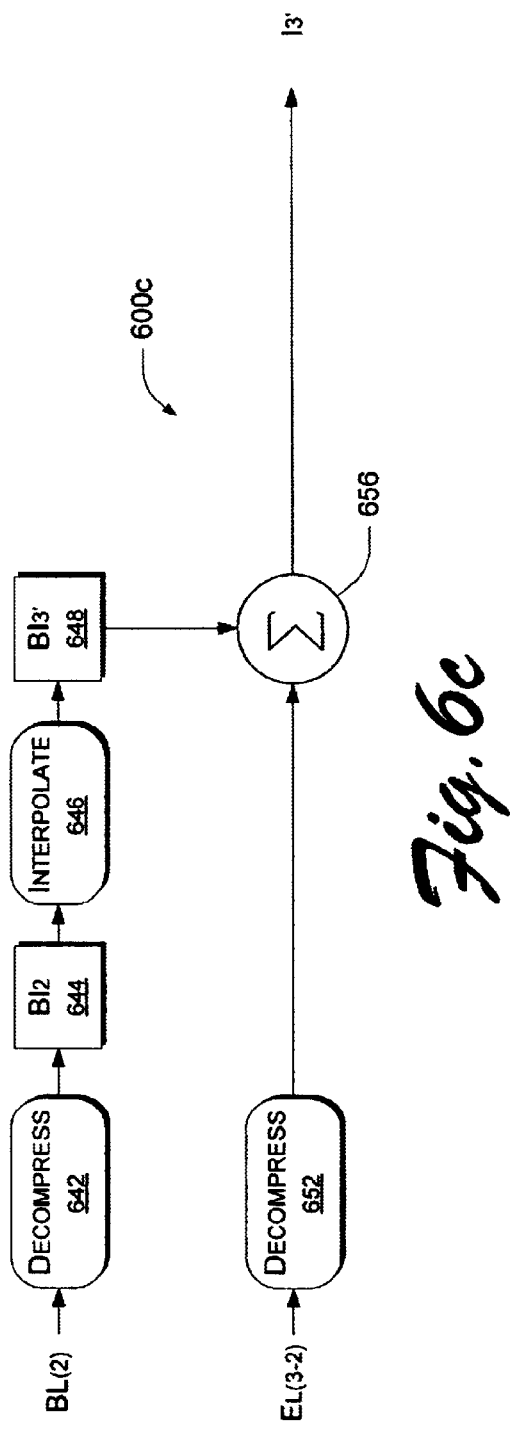
Fig. 6b
Fig. 6c

MULTIPLE MULTICASTING OF MULTIMEDIA STREAMS

RELATED APPLICATIONS

The present application is a continuation-in-part of pending U.S. patent application Ser. No. 08/714,447, entitled "Multimedia Compression with Additive Temporal Layers" by Navin Chaddha, filed Mar. 17, 1997, assigned to VXtreme Inc., herein incorporated by reference in its entirety currently pending.

BACKGROUND OF THE INVENTION

1. Field of the Invention

The present invention relates to multimedia communications. More particularly, the present invention relates to the efficient delivery of multimedia data to multicast group(s) over a diverse computer network.

2. Description of the Related Art

With the proliferation of connections to the internet by a rapidly growing number of users, the viability of the internet as a widely accepted medium of communication has increased correspondingly. Bandwidth requirements can vary significantly depending on the content of multimedia data being delivered and computational capacity of the client computers receiving the multimedia data. Hence, the ability to efficiently deliver multimedia data to a number of client computers over the internet is limited by how the available bandwidth capacity of the network is utilized to provide video information to a diverse group of client computers.

In a typical video delivery scheme, for each video stream, a point-to-point connection is provided by the network between the server and each client computer. From the network's perspective, this scheme is inefficient especially when similar content is delivered to a number of client computers. A more efficient method is to multicast "blindly" over the network without any feedback from the client computers, in a manner similar to a wireless television broadcast. One such conventional video encoding and decoding system is described in "An End-to-End Software only Scalable Video Delivery System," published in Proc. Networks and Operating System Support for Digital Audio and Video, April 1995. Instead of establishing individual point-to-point connections for each client computer, the server multicasts an entire embedded stream for different resolutions and frame rates onto the network as a set of trees. However, "the server has no idea about the decoders at the destinations" (page 136, lines 4–5) (emphasis added). Primary traffic management is performed by not adding branches of the trees carrying the less important bit streams to the lower bandwidth portions of the network. In addition, switches and routers of the network may react to temporary network congestion by dropping packets carrying the less important bits from the embedded stream.

Unfortunately, with the push multicast model described above, since "the destinations [decoders] are slaved to the flow from the server with no feedback" (page 137, lines 46–47) (emphasis added), the server is incapable of adapting to the actual needs of individual and/or sub-groups of client computers. Packets carrying less important bits are sent to client computers so long as the corresponding portion of the network is capable of carrying the additional information. In other words, the server ignores the actual needs of the client computers. For example, a user at any particular client computer may not be interested in receiving a high resolution and/or a high frame rate video stream, even if the network is capable of supporting the higher bit stream. Alternatively, a particular client computer or its modem may be incapable of processing the higher resolution and/or faster frame rate video stream. As a result, a considerable amount of unused or underutilized information is wastefully multicasted over the network and unnecessarily consumes valuable network resources.

In view of the foregoing, there are desired improved techniques for adaptively providing scalable multimedia data to a broad range of client computers while efficiently utilizing the valuable network resources.

SUMMARY OF THE INVENTION

A method of interactively providing a number of client computers with a dynamically selectable and scalable range of multimedia data over a diverse computer network including local area networks (LANs) wide area networks (WANs) such as the internet.

Multimedia data is provided by a server to the client computers includes a base layer and one or more enhancement layers. Enhancement layers can be spatial and/or temporal in nature. Depending on the implementation, the server may also provide information about the multimedia data to the client computers.

In accordance with one aspect of the invention, the server splits the multimedia data for streaming via multiple multicast group (MMG) addresses. Information about the portion of the multimedia data carried by each MMG is broadcasted to the client computers. Armed with the information about the multimedia data, client computers can intelligently join and leave MMGs as needed.

In some embodiments, the client computers provide feedback about the usage and/or need for the multimedia data, enabling the server to right-size, e.g., grow and/or prune, the multimedia data for network efficiency. With right sizing, the content of the base layer may be increased or decreased with the corresponding growing and pruning of the enhancement layers. Enhancement layers may also be grown and/or pruned independently of the base layer, i.e., without a corresponding change in the base layer.

These and other advantages of the present invention will become apparent upon reading the following detailed descriptions and studying the various figures of the drawings.

BRIEF DESCRIPTION OF THE DRAWINGS

FIGS. 6B and 6C illustrate decoding circuits for regenerating a similar enhanced image from different base layers and enhancement layers.

DETAILED DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order to not unnecessarily obscure the present invention.

Figure 1:
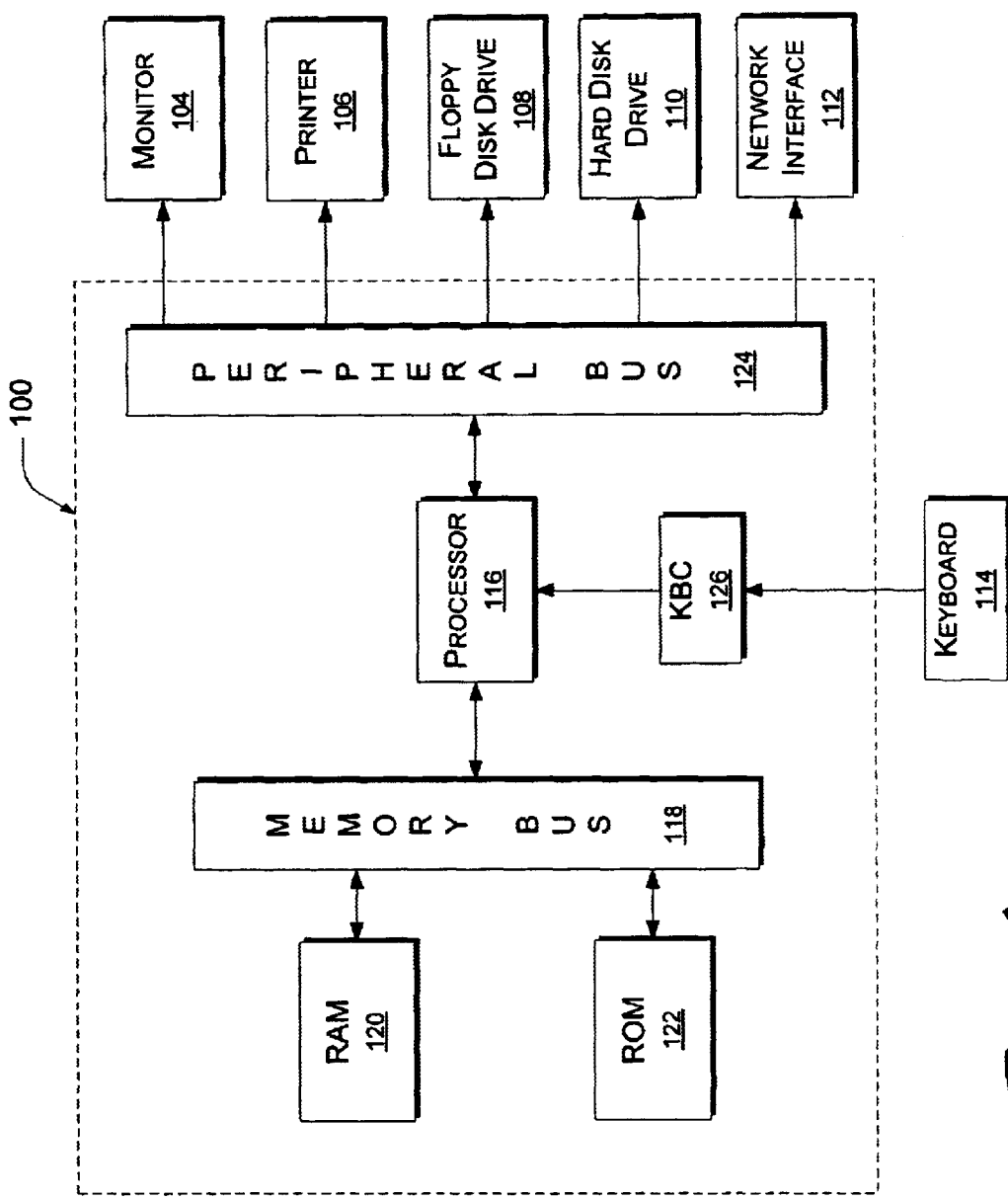
FIG. 1 is a block diagram of an exemplary computer system for practicing the various aspects of the present invention.

FIG. 1 is a block diagram of an exemplary computer system 100 for practicing the various aspects of the present invention. Computer system 100 includes a display screen (or monitor) 104, a printer 106, a floppy disk drive 108, a hard disk drive 110, a network interface 112, and a keyboard 114. Computer system 100 includes a microprocessor 116, a memory bus 118, random access memory (RAM) 120, read only memory (ROM) 122, a peripheral bus 124, and a keyboard controller 126. Computer system 100 can be a personal computer (such as an Apple computer, e.g., an Apple Macintosh, an IBM personal computer, or one of the compatibles thereof), a workstation computer (such as a Sun Microsystems or Hewlett-Packard workstation), or some other type of computer system known to one skilled in the computer art.

Microprocessor 116 is a general purpose digital processor which controls the operation of computer system 100. Microprocessor 116 can be a single-chip processor or can be implemented with multiple components. Using instructions retrieved from memory, microprocessor 116 controls the reception and manipulation of input data and the output and display of data on output devices.

Memory bus 118 is used by microprocessor 116 to access RAM 120 and ROM 122. RAM 120 is used by microprocessor 116 as a general storage area and as scratch-pad memory, and can also be used to store input data and processed data. ROM 122 can be used to store instructions or program code followed by microprocessor 116 as well as other data.

Peripheral bus 124 is used to access the input, output, and storage devices used by computer system 100. In the described embodiment(s), these devices include display screen 104, printer device 106, floppy disk drive 108, hard disk drive 110, and network interface 112. Keyboard controller 126 is used to receive input from keyboard 114 and send decoded symbols for each pressed key to microprocessor 116 over bus 128.

Display screen 104 is an output device that displays images of data provided by microprocessor 116 via peripheral bus 124 or provided by other components in computer system 100. Printer device 106, when operating as a printer, provides an image on a sheet of paper or a similar surface. Other output devices such as a plotter, typesetter, etc. can be used in place of, or in addition to, printer device 106.

Floppy disk drive 108 and hard disk drive 110 can be used to store various types of data. Floppy disk drive 108 facilitates transporting such data to other computer systems, and hard disk drive 110 permits fast access to large amounts of stored data.

Microprocessor 116 together with an operating system operate to execute computer code and produce and use data. The computer code and data may reside on RAM 120, ROM 122, or hard disk drive 120. The computer code and data could also reside on a removable program medium and loaded or installed onto computer system 100 when needed. Removable program mediums include, for example, CD-ROM, PC-CARD, floppy disk and magnetic tape.

Network interface circuit 112 is used to send and receive data over a network connected to other computer systems. An interface card or similar device and appropriate software implemented by microprocessor 116 can be used to connect computer system 100 to an existing network and transfer data according to standard protocols.

Keyboard 114 is used by a user to input commands and other instructions to computer system 100. Other types of user input devices can also be used in conjunction with the present invention. For example, pointing devices such as a computer mouse, a track ball, a stylus, or a tablet can be used to manipulate a pointer on a screen of a general-purpose computer.

The present invention can also be embodied as computer readable code on a computer readable medium. The computer readable medium is any data storage device that can store data which can be thereafter be read by a computer system. Examples of the computer readable medium include read-only memory, random-access memory, magnetic data storage devices such as diskettes, and optical data storage devices such as CD-ROMs. The computer readable medium can also be distributed over a network coupled computer systems so that the computer readable code is stored and executed in a distributed fashion.

Figure 2:
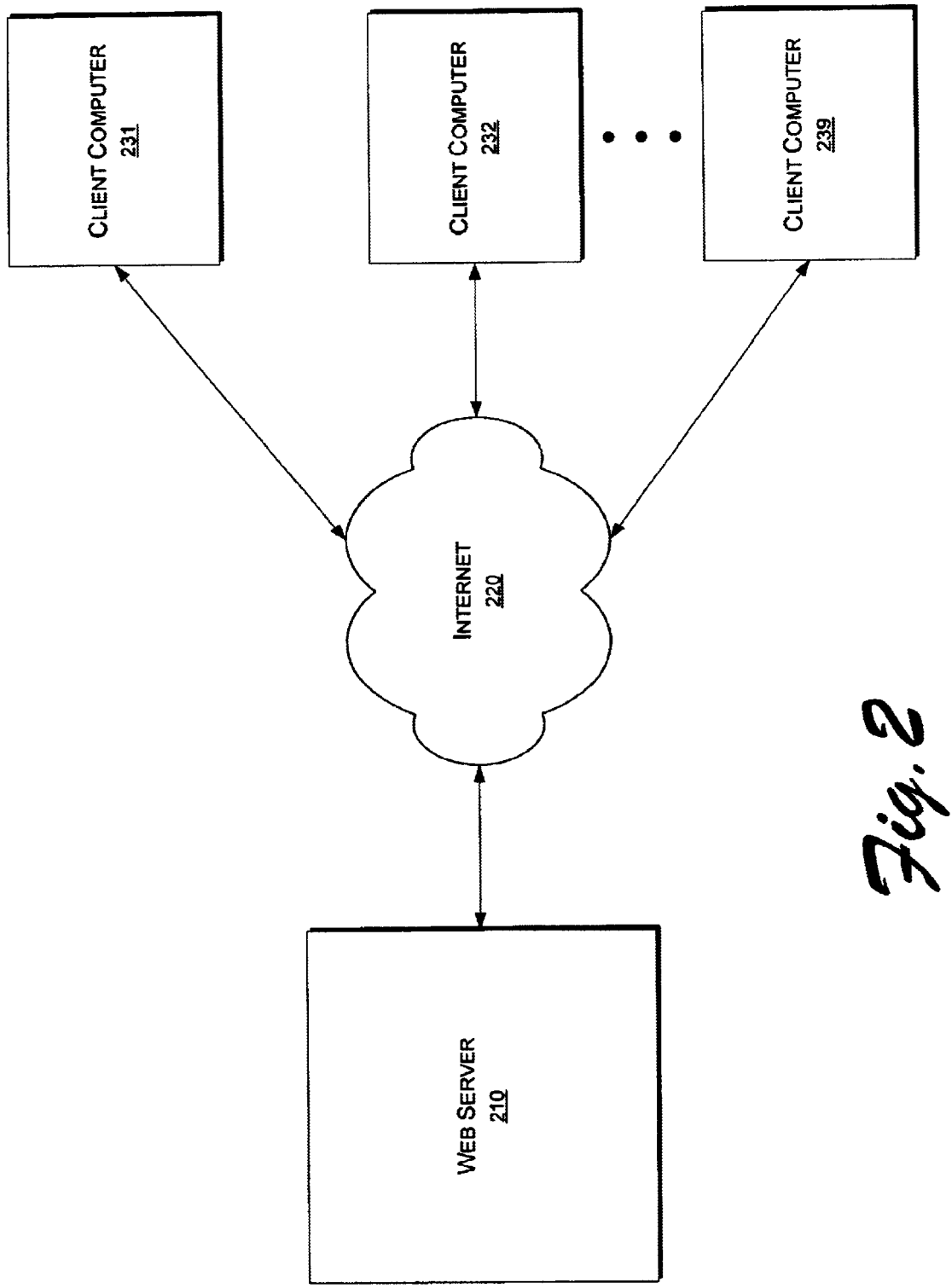
FIG. 2 is a block diagram showing an exemplary hardware environment for practicing the invention which includes a web server and client computers, coupled to each other by a computer network.

FIG. 2 is a block diagram showing an exemplary hardware environment for practicing the invention which includes a web server 210 and client computers 231, 232, ... 239, coupled to each other by computer network 220. Each of server 210 and client computers 231, 232, ... 239 can be implemented using a computer system such as computer system 100 described above. In this implementation, computer network 220 supports both point-to-point connections and multiple multicast groups.

In accordance with the present invention, server 210 transmits multimedia data, e.g., video, audio and/or annotation frames, to two or more of client computers 231, 232, ... 239. Efficiency is accomplished by transmitting the multimedia data in the form of a base layer and one or more enhancement layers to one or more multicast groups, and wherein the multimedia data is shared by two or more of client computers 231, 232, ... 239. Enhancement layer(s) can be either spatial and/or temporal in nature.

Figure 3:
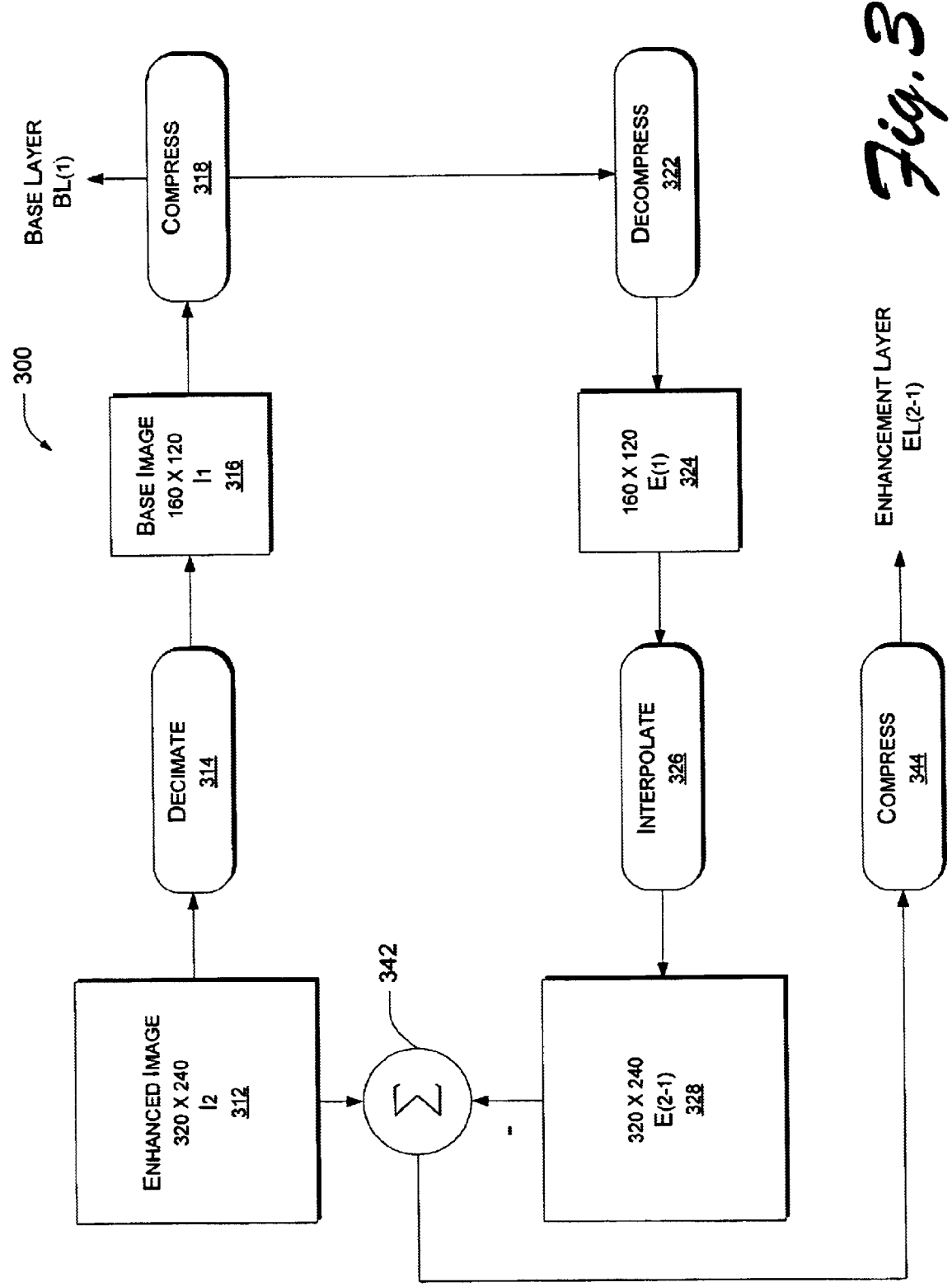
FIG. 3 is a block diagram illustrating one embodiment of an encoder in which multimedia data representing an enhanced video image is encoded separately into a base layer and an enhancement layer.

FIG. 3 is a block diagram illustrating one embodiment of encoder 300 in which multimedia data representing an enhanced video image 312 is encoded separately into a base layer BL(1), representing a base image 316, and an enhancement layer EL(2-1), representing the spatial difference between base image 316 and enhanced image 312, using a suitable encoding technique such as a Laplacian pyramid decomposition algorithm, known to one skilled in the art.

In this exemplary encoding process, enhanced image 312 is decimated 314, i.e., filtered and sub-sampled, into base image 316 which is compressed 318 to produce base layer BL(1). Next, base layer BL(1) is decompressed 322, upsampled, e.g., by interpolation 326, and then subtracted 342 from enhanced image 312 to produce an error image. The error image is then compressed 344 to produce an enhancement layer EL(2-1) which represents the error data between base image 316 and enhanced image 312. This process can be repeated to produce multiple enhancement layers as described below.

Figure 4:
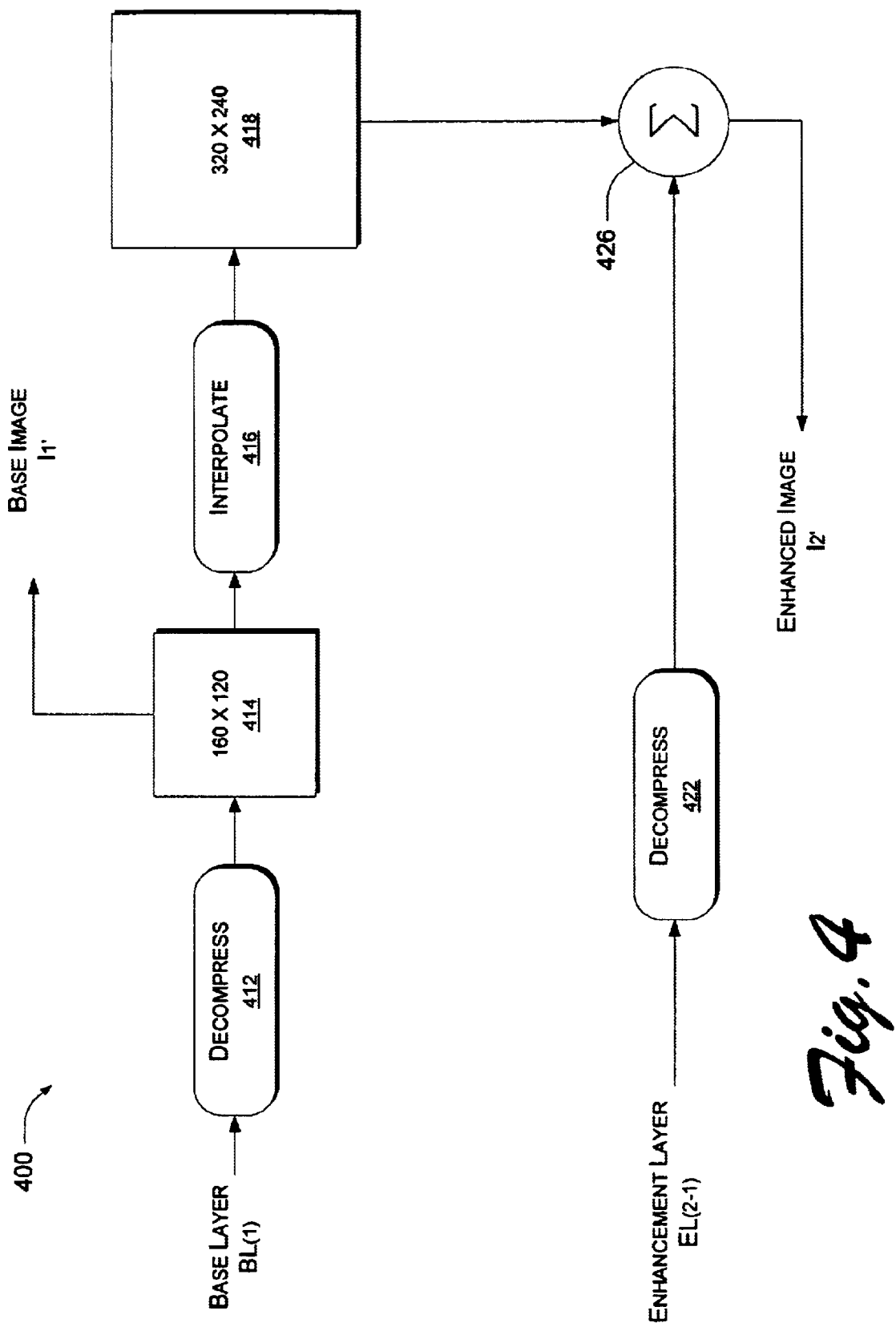
FIG. 4 illustrates an associated decoder for decoding the base layer and the enhancement layer of FIG. 3 to regenerate a base image and an enhanced image.

Conversely, in an exemplary associated decoder 400, as illustrated by FIG. 4, base layer BL(1) and enhancement layer EL(2-1) are used to regenerate a base image I1' and an enhanced image I2'. Regenerated base image I1' is produced by decompressing 412 base layer BL(1). Regenerated enhanced image I2' is produced by combining 426 an interpolated 416 base image I1' with a decompressed 422 enhancement layer EL(2-1).

Figure 5A:
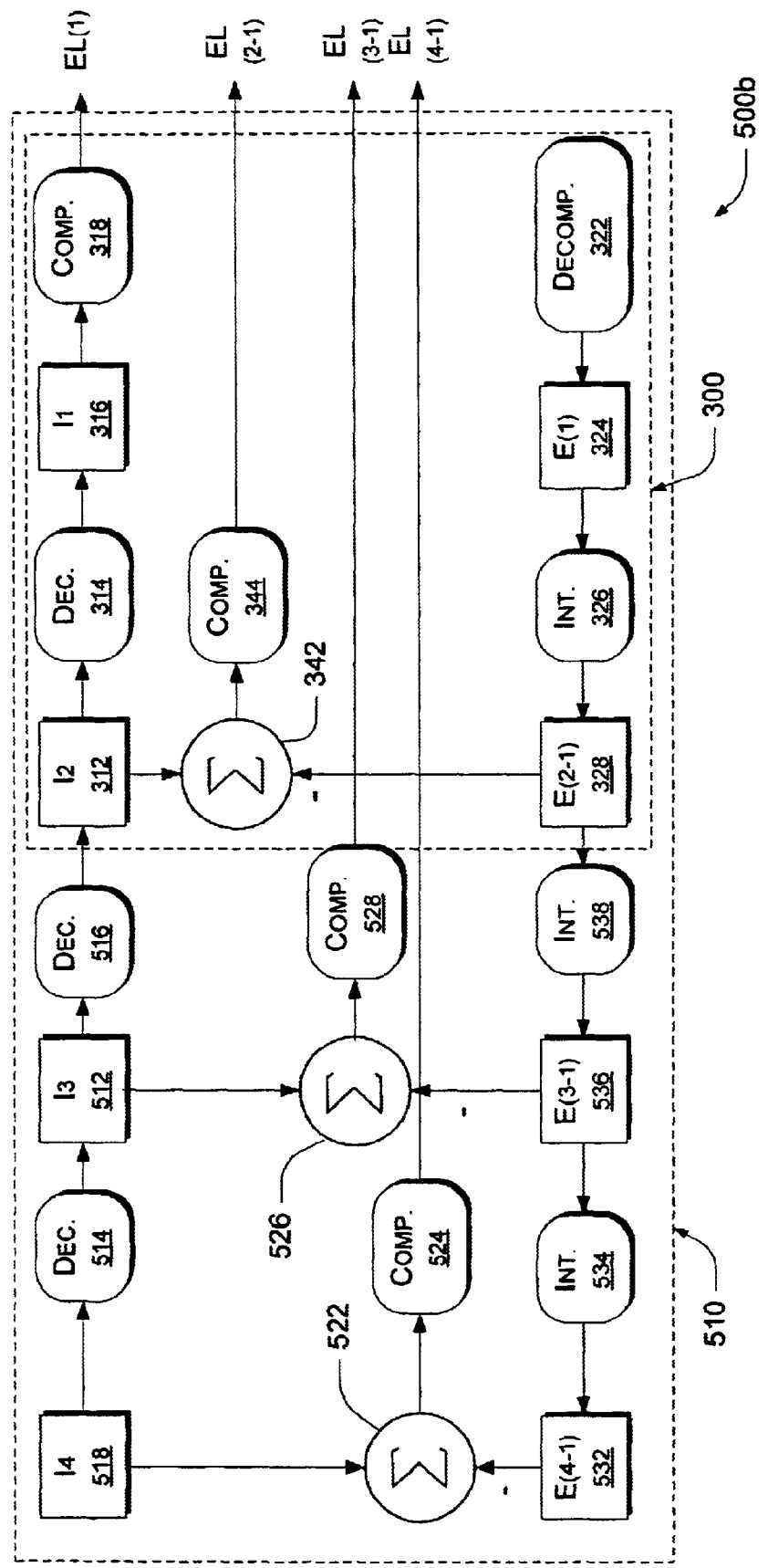
FIG. 5A is a block diagram of an encoder capable of generating additional enhancement layer(s).

Referring now to FIG. 5A, in encoder 510, additional enhancement layers EL(3-1), EL(4-1) are generated from enhanced images 518, 512, by combining decimation stages 514, 516, compression stages 524, 528, interpolation stages 534, 538, and summation stages 522, 526 to encoder 300, in a manner similar to the generation of enhancement layer EL(2-1) described above.

Figure 6A:
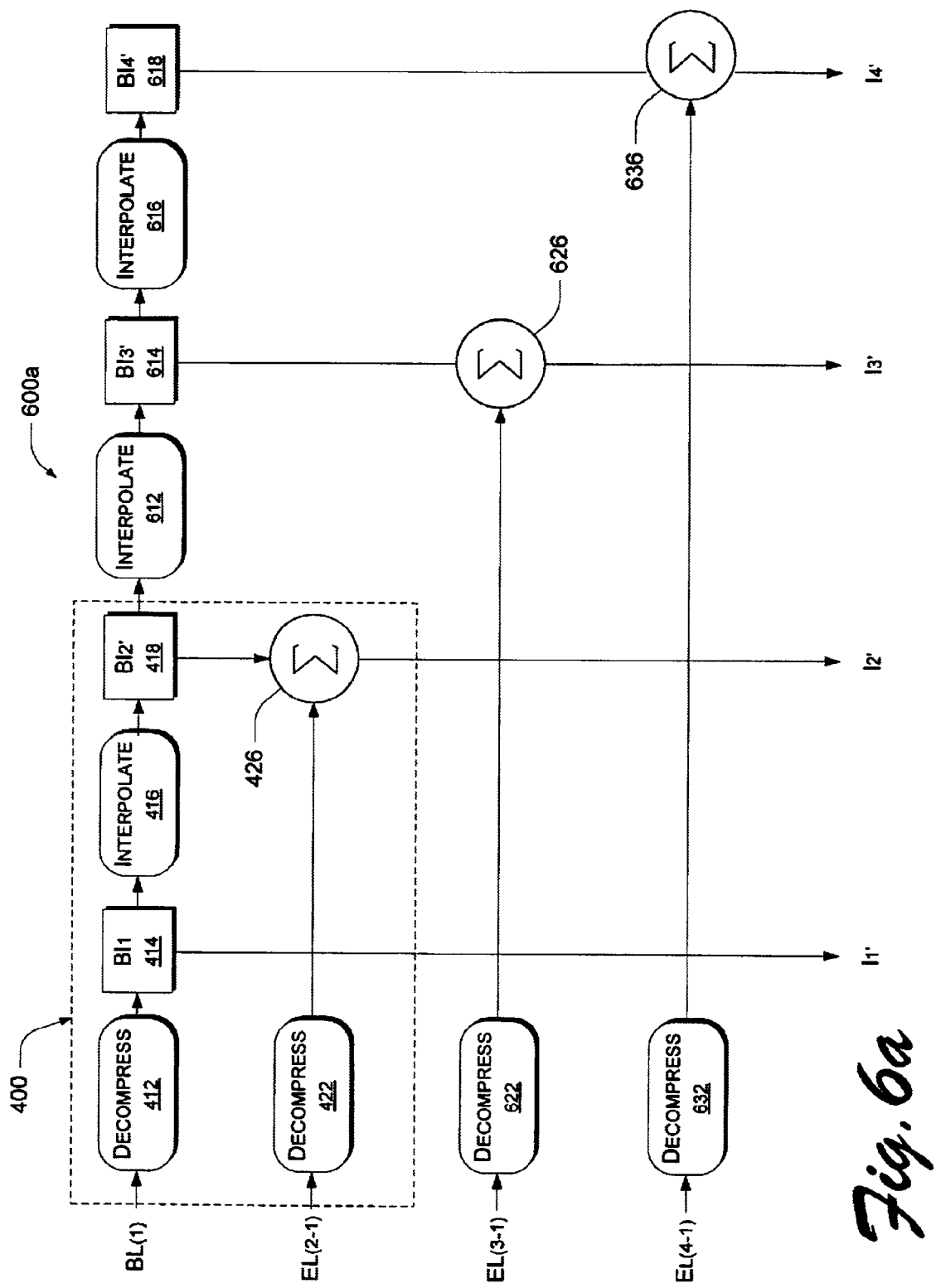
FIG. 6A is a block diagram of a decoder capable of decoding additional enhancement layer(s).

Conversely, as shown in FIG. 6A, in decoder 600a, additional enhanced images I3', I4' are regenerated from enhancement layers EL(3-1), EL(4-1), by combining decompression stages 622, 632, interpolation stages 612, 616, and summation stages 626, 636 to decoder 400, in a manner similar to the regeneration of enhanced image I2' described above.

Figure 7A:
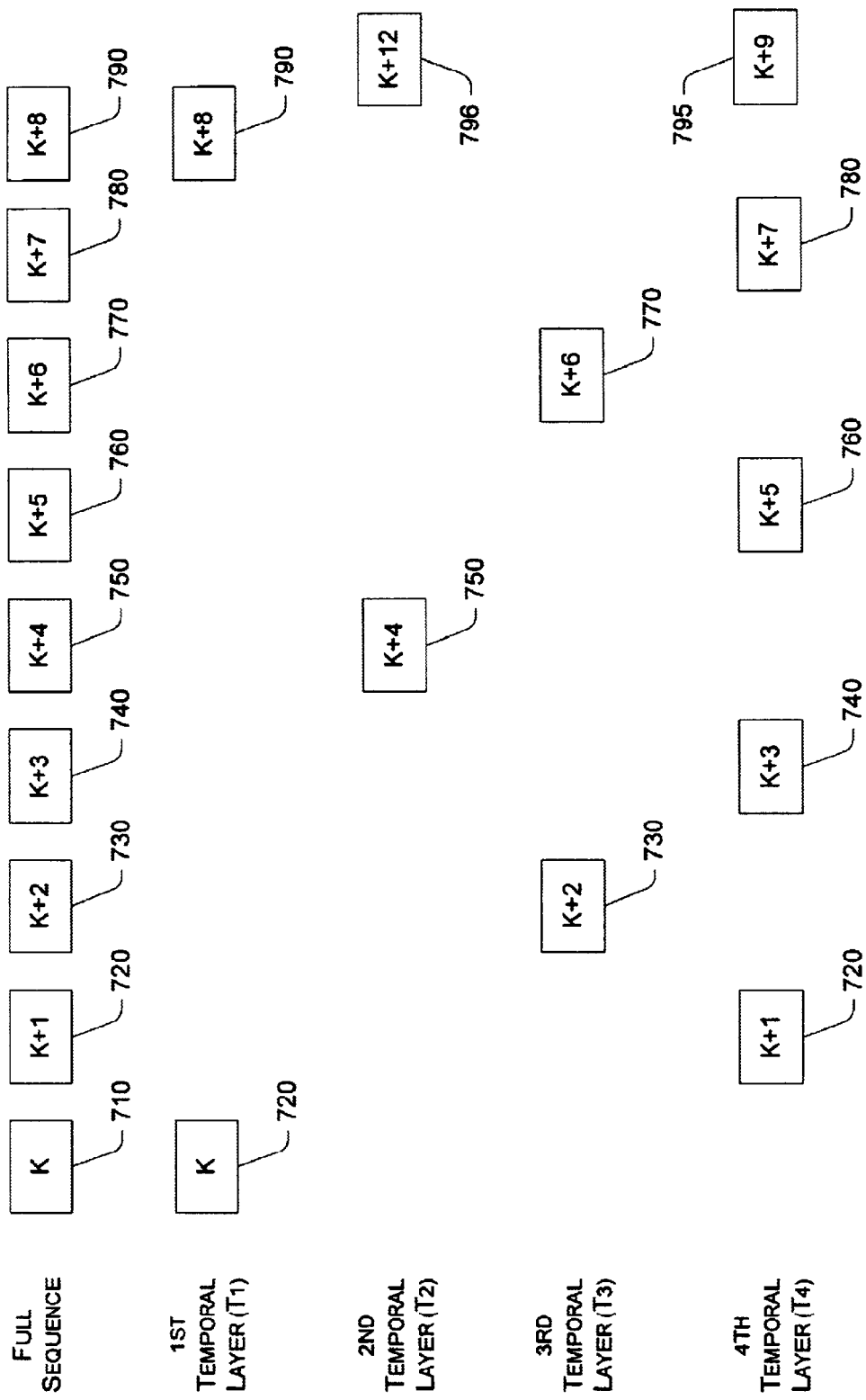
FIG. 7A illustrates how multimedia data representing a full temporal sequence can be separated into multiple temporal layers.

FIG. 7A illustrates how multimedia data representing a full temporal sequence with frames k, k+1, k+2, ... k+8, ... can be separated into a first temporal layer with frames k, k+4, k+8, ... a second temporal layer with frames k+2, k+6, ... and a third temporal layer with frames k+1, k+3, k+5, k+7 ... Accordingly, the first temporal layer is the base layer while the second and third temporal layers are enhancement layers. In this example, in order to optimize network efficiency, the base layer is independent, e.g., includes I frames with complete frame data, while the enhancement layers are additive, e.g., includes P frames with differential data based on other frames. Alternatively, the temporal enhancement layers can also be independent. For example, enhancement frames k+1, k+2, k+3, k+5, k+6, k+7 . . . can also be I frames, but with a corresponding increase in transmission overhead when streamed over network 220.

Figure 7B:
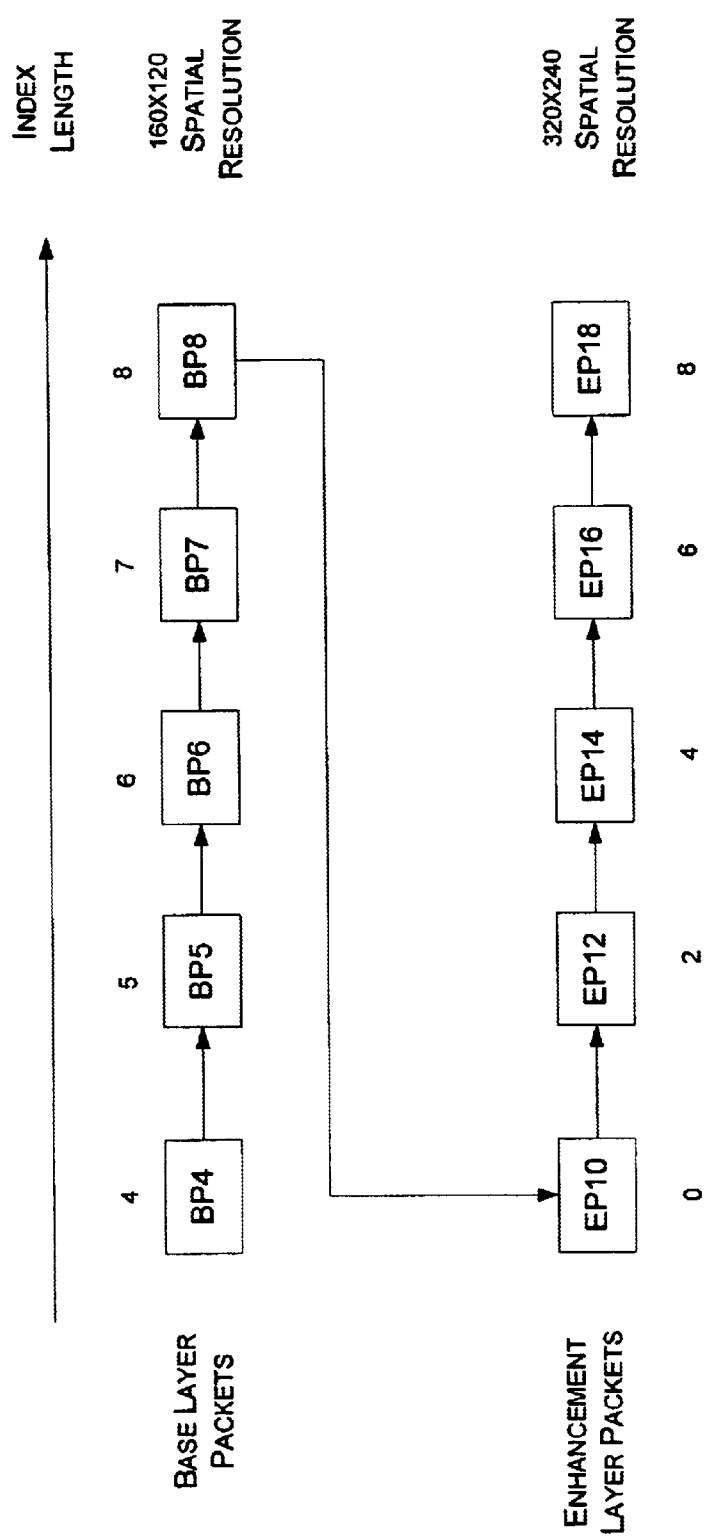
FIG. 7B shows an exemplary spatial arrangement of base layer packets and enhancement layer packets.

FIG. 7B shows an exemplary spatial arrangement of base layer packets BP4, BP5, BP6, BP7 and BP8, and enhancement layer packets EP10, EP12, EP14, EP16 and EP18. In this example, server 210 transmits index-planes for different resolutions in different packets. Hence, base packet BP4 corresponds to the base layer with 4-bits of an index, and base packet BP8 includes the $8^{th}$ bit of the index for the base layer. Similarly, enhancement packet EP14 includes the $4^{th}$ bit of the index for the first enhancement layer.

Bandwidth scalability with an embedded bit stream can be accomplished using vector quantization (VQ). In one embodiment, a tree-structured VQ (TSVQ) successive approximation technique is implemented. Accordingly, codewords are arranged in a tree structure, and each input vector is successively mapped (from the root node) to the minimum distortion child node, thereby inducing a hierarchical partition, or a refinement of the input space as the depth of the tree increases. Because of the successive refinement, an input vector mapping to a leaf node can be represented with high precision by the path map from the root to the leaf, or with lower precision by any prefix of the path. Accordingly, TSVQ produces an embedded encoding of the data. Pending U.S. patent application, Ser. No. 08/819,579, attorney docket number VXT_712, entitled "Method and Apparatus for Table-based Compression with Embedded Coding" by Navin Chaddha, filed on Mar. 14, 1997, and assigned to VXtreme Inc., herein incorporated by reference in its entirety, describes several exemplary TSVQ implementations that can be practiced with the present invention.

Figure 8:
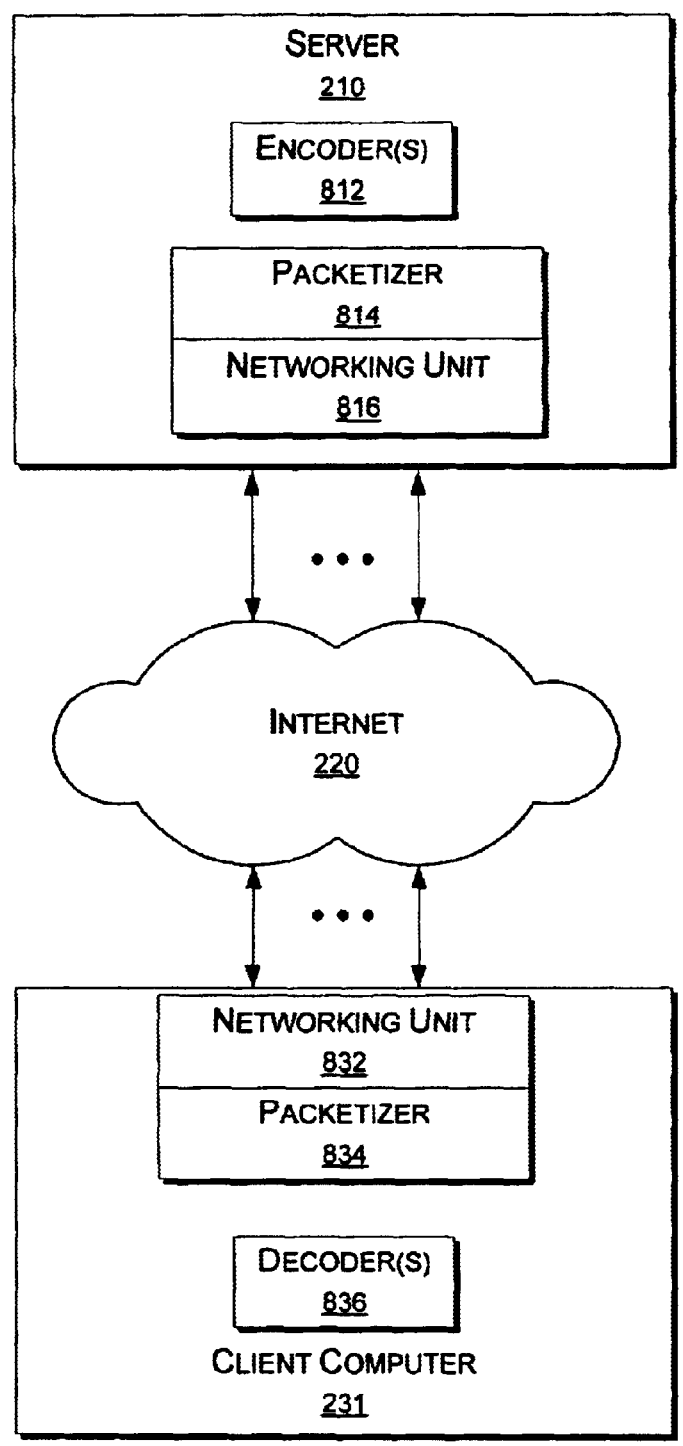
FIG. 8 is a detailed block diagram showing one embodiment of a server and a representative client computer.

FIG. 8 is a detailed block diagram showing one embodiment of server 210 and client computer 231, representative of client computers 231, 232, . . . 239. Accordingly, the following description of the operation of client computer 231 also applies to client computers 232 . . . 239. Server 210 and client computer 231 are coupled to each other via computer network 220 which supports multicast addresses and multiple multicasts.

Server 210 includes an encoder 812, a source packetizer 814 and a source networking unit 816. Encoder 812 includes a conditional replenishment unit, a Laplacian pyramid encoder with a tree structured hierarchical table lookup vector quantizer (TSHVQ) based on a perceptual distortion measure. Client computer 231 includes a decoder 836, destination packetizer 834 and a destination networking unit 832. Decoder 836 includes a table-lookup vector quantizer with support for color-convertion and dithering. Video decoding is performed on those blocks which change with respect to the previous frame. Encoder 812 can be any one of encoders 300, 510, and decoder 836 can be any one of decoders 400, 600a.

Server 210 executes the first stage of the encoding process, embedded conditional replenishment, in encoder 812. The blocks which change are encoded using the Laplacian pyramid algorithm with the TSHVQ. Encoder 812 produces the indices for each layer as an embedded stream with different index planes. The first index plane contains the index for the rate 1/k TSHVQ codebook. The second index plane contains the additional index which along with the first index plane gives the index for the rate 2/k TSVQ codebook. Similarly, the remaining index planes have part of the indices for 3/k, 4/k, . . . R/k TSVQ codebooks, respectively. As a result, encoder 812 advantageously produces indices with the embedded prioritized bit-stream. Subsequently, rate or bandwidth scalability can be achieved at client computer 231 by dropping index planes from the embedded bit-stream.

After encoder 812 has completed generating the embedded bit-stream, source packetizer 814 packages the embedded bit-stream into a number of embedded video stream packets based on RTP protocol and appends the respective packet headers. Depending on the needs of client computers 231, 232, . . . 239, source networking unit 816 can now split the embedded video stream packets into one or more multicast groups in accordance with the present invention.

In one exemplary multiple multicast (MMG) scenario, as illustrated by FIGS. 7A and 7B, a first multicast group may receive spatial layers BP4 to EP16 and temporal layers T1 to T3, while a second multicast group receives spatial layers BP4 to BP8 and temporal layers T1 to T2.

In another MMG scenario with joint source-channel coding of two layers, e.g., base layer BL1 and enhancement layer EL(2-1), are split into several embedded layers and sent by source network unit 816 on MMGs after packetization by packetizer 814. Subsets of the embedded bit-stream are sent on different multicast addresses. In this example, spatial layers BP4, (BP5–BP8), (EP12–EP14) and (EP16–EP18) can be sent in temporal layers T1, T2, T3 and T4, resulting in eight different layers which can be sent on different multicast addresses.

In accordance with one aspect of the invention, client computer 231 intelligently decides which multicast (address) groups to dynamically join or leave. This is possible because server 210 periodically provides updated information to client computer 231 about the different multicast groups, their associated data transfer rates, which portion of the spatial-temporal embedded stream belongs to which MMG, and information about base layer(s) of the embedded stream. A network bandwidth estimation algorithm keeps track of the available network bandwidth of network 220 supporting the respective MMGs. One such network bandwidth estimation algorithm is described in pending U.S. patent application, Ser. No. 08/818,127, attorney docket number VXT_706, entitled "Dynamic Bandwidth Selection for Efficient Transmission of Multimedia Streams in a Computer System" by Hemanth S. Ravi, assigned to VXtreme, Inc., and is herein incorporated by reference in its entirety.

Armed with the information provided by server 210, client computer 231 is able to reliably predict both the cost and benefit of joining additional MMGs in addition to the MMG(s) client computer 231 has already joined. Accordingly, if there is network bandwidth available, then client computer 231 joins additional MMG(s) till the bandwidth associated with the MMGs is used up. Conversely, when client computer 231 detects that it is consuming more network bandwidth than is available, client computer 231 leaves some MMGs till the consumption of the network bandwidth is less than or equal to the available network bandwidth. In other words, client computer 231 attempts to efficiently maintain a healthy equilibrium between its need and the availability of the network bandwidth. As a result, the dynamic bandwidth adaptation of the present invention, accomplished by intelligently joining and/or leaving MMGs, advantageously reduces network congestion and packet losses, while optimizing the transfer rates.

Referring again to FIG. 8, when the data packets arrive at client computer 231, destination networking unit 832 splits the embedded bit stream packets into MMGs. Packets associated with the selected, i.e., joined, are depacketized by destination depacketizer 834 and provided to decoder 836.

Decoder 836 then use the remaining embedded stream to index a TSVQ codebook of the corresponding rate, e.g., by looking up the reproduction vector in the corresponding rate TSVQ decoder 836 codebook. In this example, since the inverse block transform is performed on the codewords of encoder 812 codebook, there is no need for performing inverse block transforms on decoder 836 codebook.

As discussed above, computational scalability is provided at decoder 836 by the use of the Laplacian coding scheme and the use of TSVQ. TSVQs achieves computation scalability proportional to the bandwidth of network 220 as the computation performed in lookups is different for different TSVQ codebooks and scales proportionately with the depth of the tree. In sum, the streaming of scalable multimedia data which includes a base layer and at least one enhancement layer by server 210 enables client computer 231 to select different MMGs in search of the best match with the bandwidth of network 220.

However, because encoder 510 of FIG. 5A provides a single predetermined base layer BL1 and an associated range of enhancement layers EL(2-1), EL(3-1), EL(4-1), the ability of encoder 510 to adapt to the actual needs of client computer 231, 232, . . . 239 is limited to growing and pruning enhancement layers EL(2-1), EL(3-1), EL(4-1).

Figure 5B:
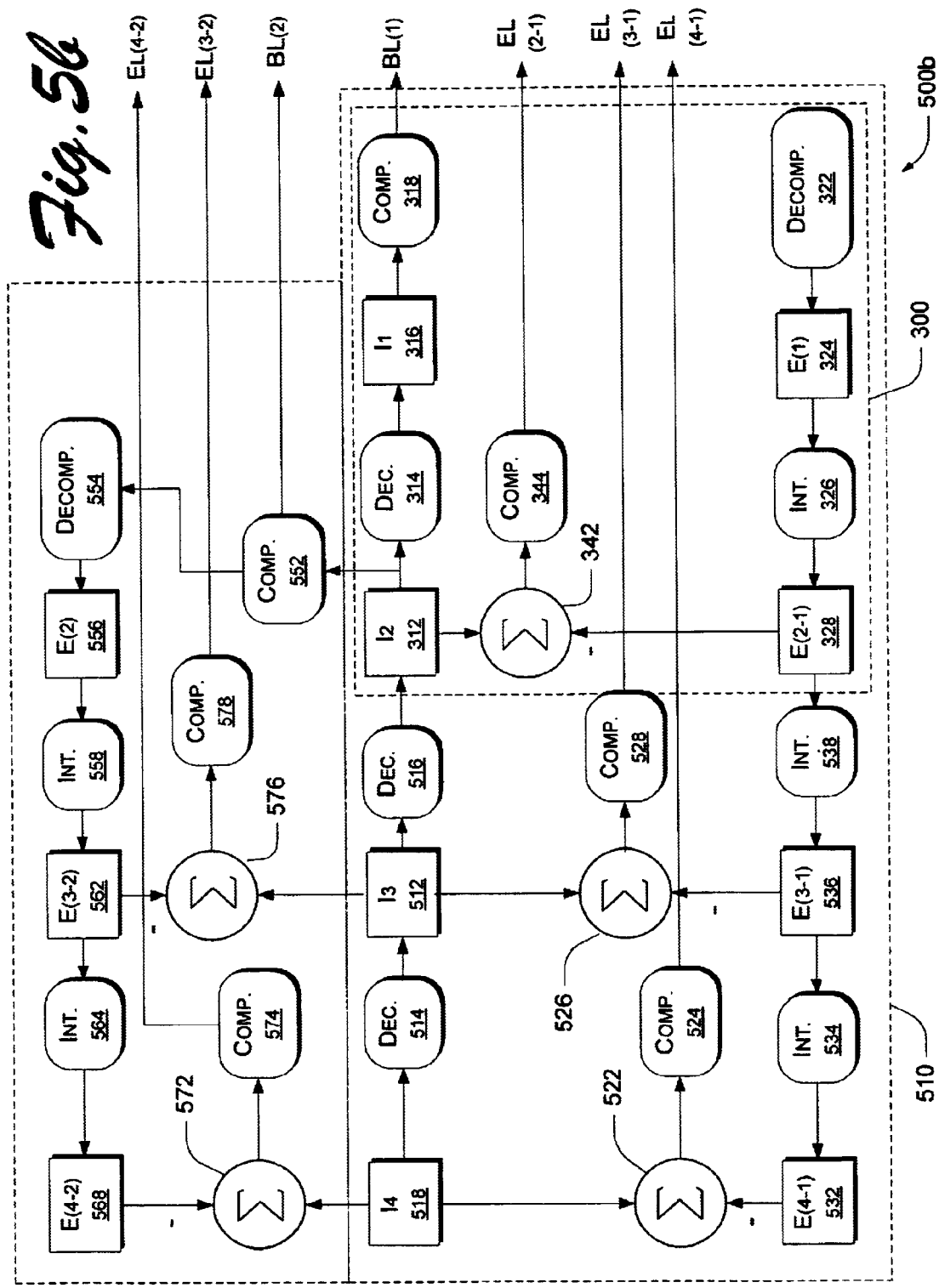
FIG. 5B is a block diagram of yet another encoder capable of generating additional base layer(s).

In accordance to another aspect of the invention illustrated by FIG. 5B, an expanded encoder 500b generates additional base layer(s), e.g., an additional higher content base layer BL(2) and corresponding enhancement layers EL(3-2), EL(4-2) from enhanced images 518, 512 in a manner similar to the generation of base layer BL(1) and enhancement layers EL(2-1), EL(3-1), EL(4-1) described above. Hence, expanded encoder 500b includes decompression stage 554, compression stages 552, 578, 574, interpolation stages 558, 564, and summation stages 572, 576 in addition to encoder 510.

Functionally, by including expanded encoder 500b in server 210, in addition to growing and pruning the enhancement layers, server 210 is now able to provide one or more MMGs with a choice from two or more different base layers, upon request by anyone of client computers 231, 232, . . . 239. For example, upon a request for a higher content base layer when the lowest bandwidth actually used by any one of client computers 231, 232, . . . 239, corresponds to image 12', server 210 begins providing MMGs with base layer BL(2), thereby eliminating the need for combining base layer BL1 with EL(2-1) to generate 12'.

FIGS. 6B and 6C show decoding circuits 600b and 600c, for generating reconstructed image I3' from different base layers BL(1) and BL(2), respectively. In this example, decoding circuit 600b, which exists in decoder 600a, reconstructs image I1' by combining base layer BL(1) with enhancement layer EL(3-1), while decoding circuit 600c reconstructs image I3' by combining base layer BL(2) with enhancement layer EL(3-2). Hence, by expanding decoder 600a to include the additional decoding functionality, such as the functionality provided by decoding circuit 600c, the expanded version of decoder 660a is now capable of receiving a higher content base layer, e.g., BL(2), thereby further improving network efficiency.

Figure 9:
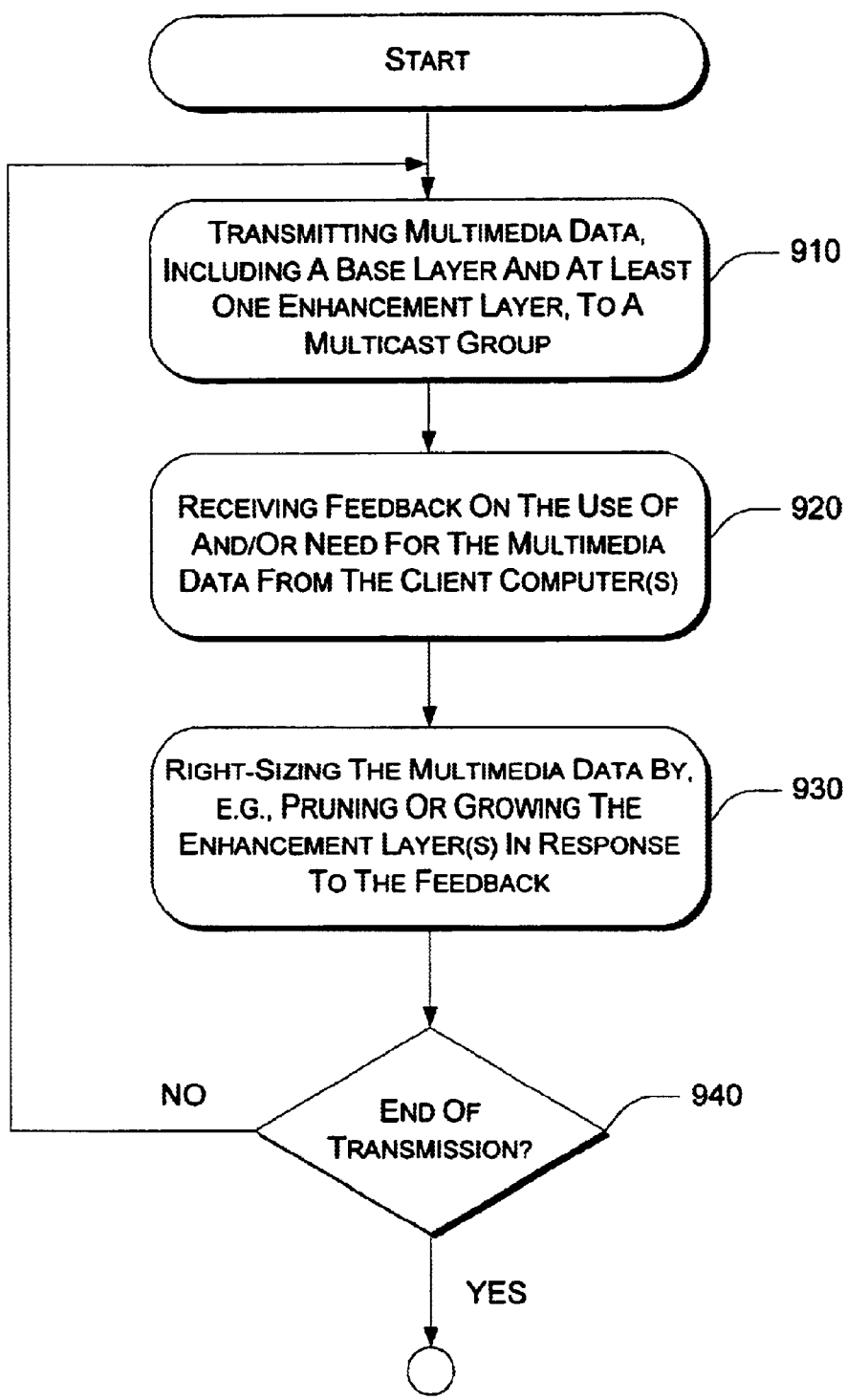
FIGS. 9 and 10 are flowcharts illustrating the adaptive right-sizing of a multimedia stream being transmitted, via a single multicast group, from the server to one or more client computers.
Figure 10:
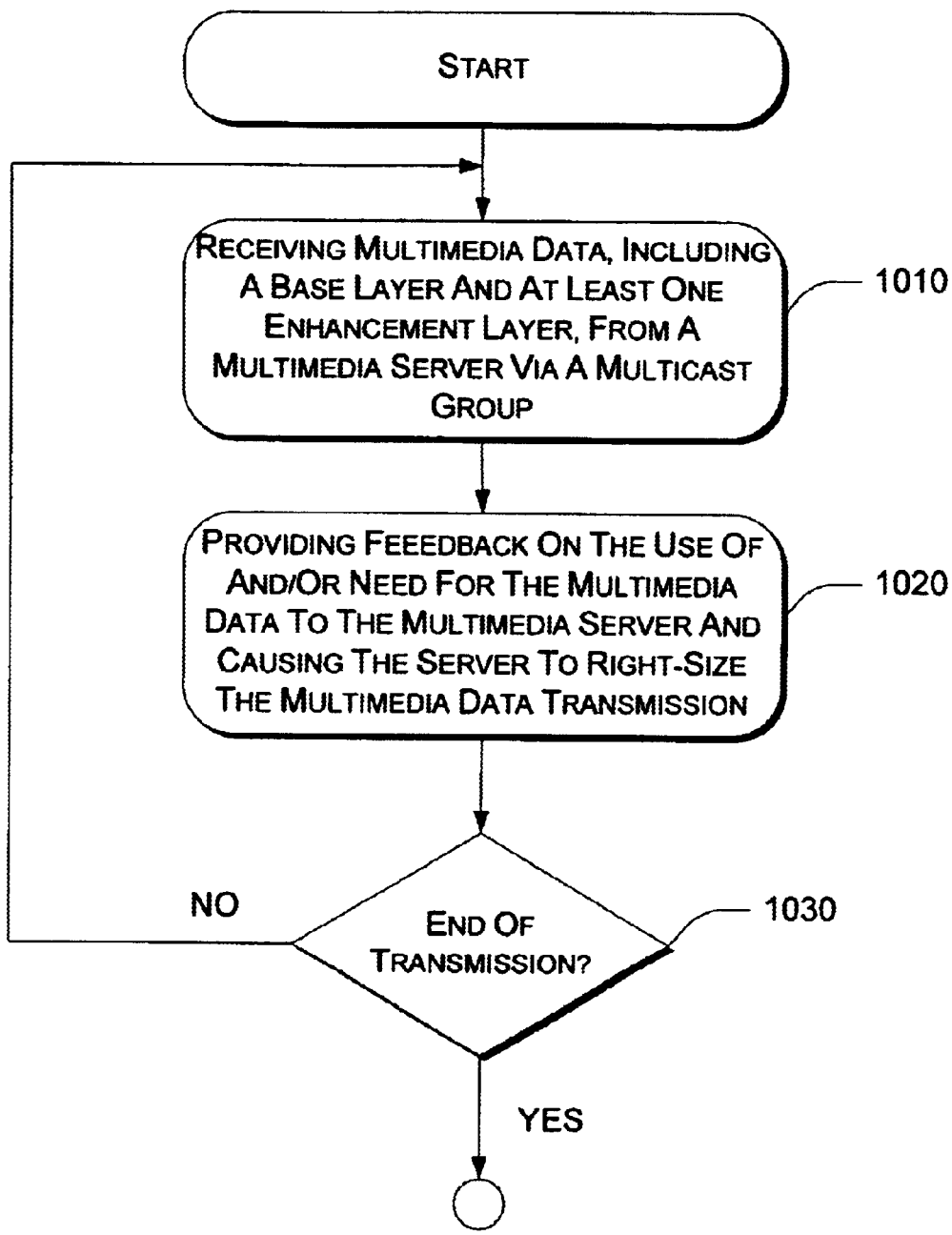

FIGS. 9 and 10 are flowcharts illustrating the adaptive right-sizing of a multimedia stream being transmitted, via a single multicast group, from a server 210 to one or more of client computers 231, 232, . . . 239. As discussed above, server 210 may optionally send information about the content of the multimedia stream to client computers 231, 232, . . . 239.

In step 910 of FIG. 9, server 210 streams the multimedia data which includes a base layer and at least one enhancement layer to the multicast group. Server 210 also listens for feedback on the use of and/or the need for the multimedia data from one or more of client computers 231, 232, . . . 239 (step 920).

In accordance with yet another aspect of the invention, server 210 adaptively right-sizes the multimedia data stream in response to the feedback from client computers 231, 232, . . . 239 (step 930). Right-sizing is the process of pruning and/or growing the multimedia data stream to better match the usage of the streams with the needs of client computers 231, 232, . . . 239. There are two related components to right sizing the multimedia stream. First, the higher base layer corresponding to the lowest bandwidth requested by client computers 231, 232, . . . 239 is selected. Next, unused enhancement layers are pruned, i.e., not transmitted to client computers 231, 232, . . . 239.

Subsequently, depending on the needs of client computers 231, 232, . . . 239, the current base layer may be replaced by a lower content or a higher content base layer. Similarly, depending on the need of client computers 231, 232, . . . 239 and the availability of network 220, the enhancement layers may be grown or pruned. The right-sizing process is repeated until the multicast of the stream is complete (step 940).

Conversely, as shown in the flowchart of FIG. 10, client computer 231, receives multimedia data via the multicast group (1010). Client computer 231 also provides feedback on the use of and/or need for the multimedia to server 210, thereby causing server 210 to right-size the multimedia data in the manner described above (step 1020).

Figure 11:
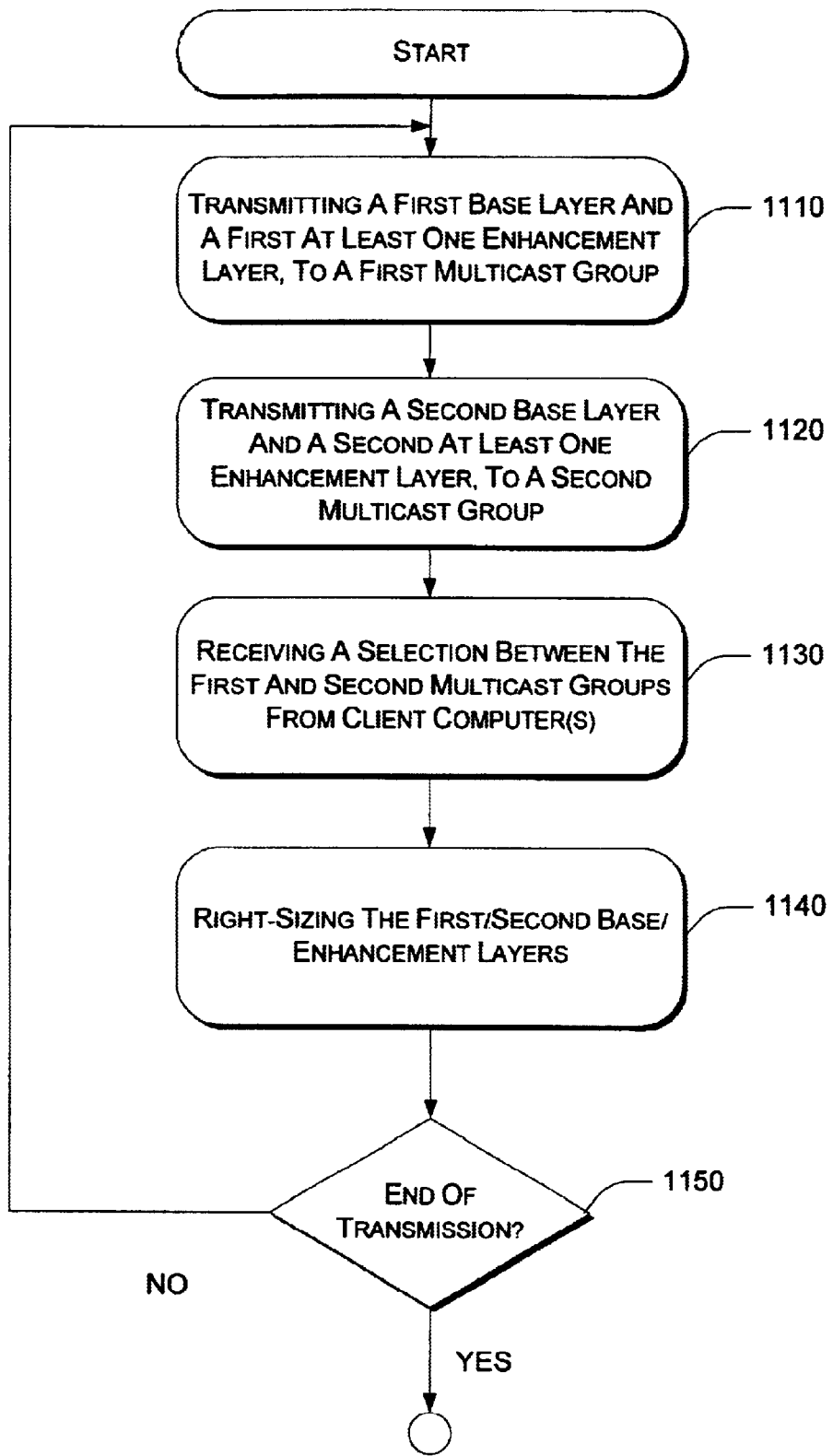
FIGS. 11 and 12 are flowcharts illustrating the adaptive right-sizing of a multimedia stream being transmitted, via multiple multicast groups (MMGs), from the server to one or more client computers.
Figure 12:
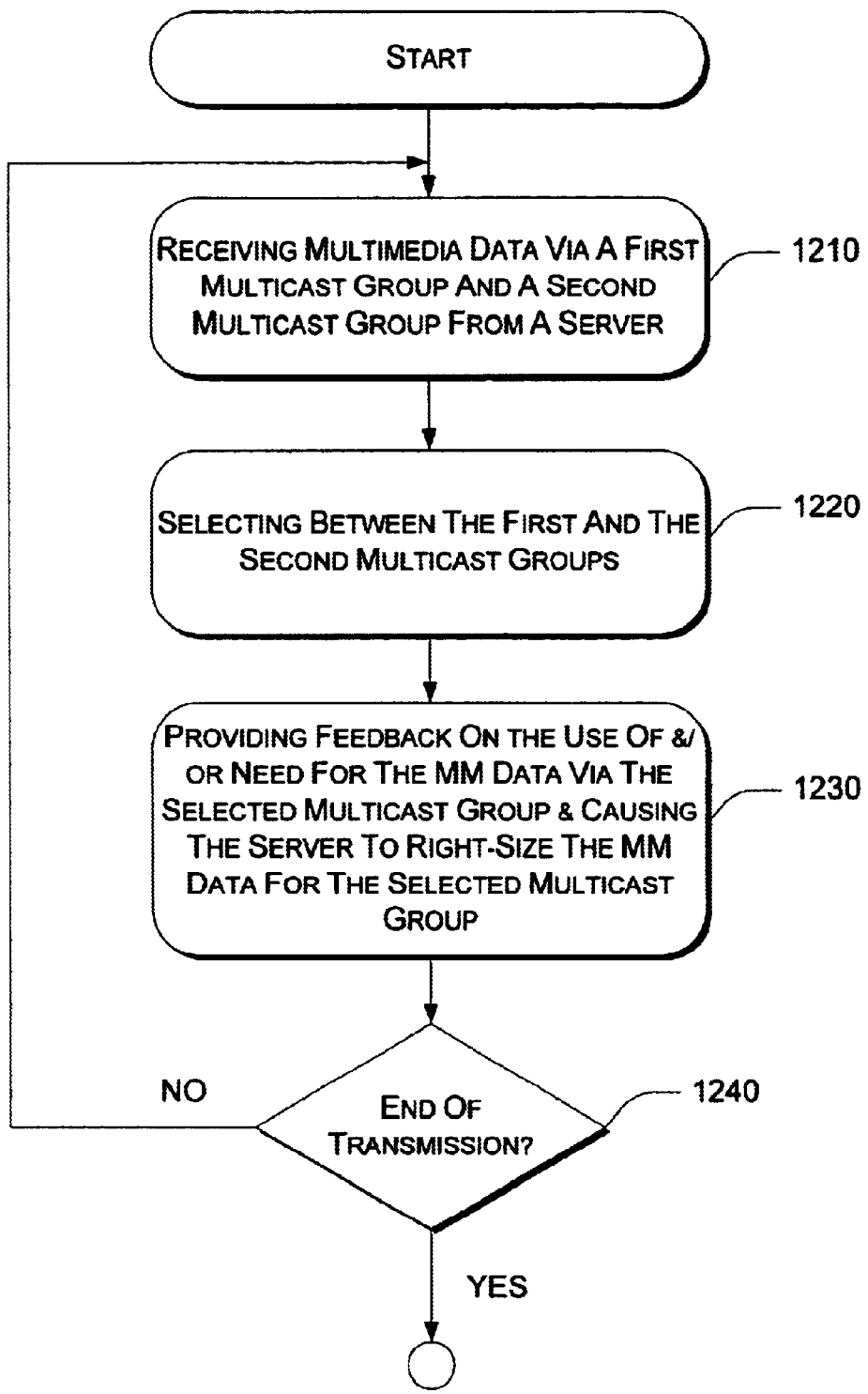

FIGS. 11 and 12 are flowcharts illustrating the adaptive right-sizing of a multimedia stream being transmitted, via multiple multicast groups (MMGs), from a server 210 to one or more of client computers 231, 232, . . . 239. As discussed above, server 210 may optionally send information about the content of the multimedia stream to client computers 231, 232, . . . 239.

In step 1110 of FIG. 11, server 210 streams a first base layer and a first at least one enhancement layer of the multimedia data to a first multicast group. Similarly, server 210 streams a second base layer and a second at least one enhancement layer of the multimedia data to a second multicast group (step 1120). Note that either the first and second base layers, or the first and second at least one enhancement layers, respectively, need to be different.

In accordance with another aspect of the invention, server 210 receives selection(s) of one or both multicast groups from one or more of client computers 231, 232, . . . 239 (step 1130). Server 210 adaptively right-sizes the multimedia data stream in response to the feedback from client computers 231, 232, . . . 239 (step 1140). As discussed above, right-sizing is the process of pruning and/or growing the multimedia data stream to better match the usage of the streams with the needs of client computers 231, 232, . . . 239.

Subsequently, depending on the needs of client computers 231, 232, . . . 239, the current first and second base layers may be replaced by a lower content or a higher content base layer. Similarly, depending on the need of client computers 231, 232, . . . 239 and the availability of network 220, the first and second enhancement layers may be grown or pruned. The right-sizing process is repeated until the multiple multicast of the stream is complete (step 1150).

Conversely, as shown in the flowchart of FIG. 12, client computer 231, receives multimedia data via the MMGs (1210). Client computer 231 then selects one or more multicast group(s) from the MMGs (1220). Client computer 231 is also tasked with providing feedback on the use of and/or need for the multimedia data to server 210, thereby causing server 210 to right-size the multimedia data in the manner described above (step 1230).

While this invention has been described in terms of several preferred embodiments, there are alterations, permutations, and equivalents which fall within the scope of this invention. For example, instead of right-sizing all MMGs, it is possible to selectively right-size some MMGs while 'blindly' multicasting to other MMGs. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. In a server coupled to at least one client computer via a network, a method for streaming data to a first multicast group and a second multicast group, said method comprising:

streaming a first base layer and a first at least one enhancement layer of said data to said first multicast group, said first at least one enhancement layer additive to said first base layer; and streaming a second base layer and a second at least one enhancement layer of said data to said second multicast group, said second at least one enhancement layer additive to said second base layer.

2. The method of claim 1 wherein said first base layer is different from said second base layer, and said first at least one enhancement layer is different from said second at least one enhancement layer.

3. The method of claim 1 wherein said first base layer is similar to said second base layer, and said first at least one enhancement layer is different from said second at least one enhancement layer.

4. The method of claim 3 wherein said first at least one enhancement layer has a larger number of enhancement layers than said second at least one enhancement layer.

5. The method of claim 1 further comprising right-sizing said data in response to feedback from said at least one client computer.

6. The method of claim 5 wherein said right-sizing includes pruning said first at least one enhancement layer by eliminating a redundant enhancement layer of said first at least one enhancement layer.

7. The method of claim 5 wherein said right-sizing includes growing said first at least one enhancement layer by adding an additional enhancement layer to said first at least one enhancement layer.

8. The method of claim 5 wherein said right-sizing includes:

increasing the content of said first base layer; and eliminating a redundant enhancement layer of said first at least one enhancement layer.

9. The method of claim 5 wherein said right-sizing includes:

decreasing the content of said first base layer; and adding an additional enhancement layer to said first at least one enhancement layer.

10. The method of claim 5 further comprising sending information about the content of said data to said at least one client computer via said first multicast group and said second multicast group.

11. The method of claim 1 wherein said first at least one enhancement layer are temporal enhancement layers.

12. The method of claim 1 wherein said first at least one enhancement layer are spatial enhancement layers.

13. The method of claim 12 wherein said spatial enhancement layers are generated using a Laplacian pyramid algorithm.

14. The method of claim 1 wherein the at least one client computer can receive and combine both the first base layer of the streaming data for the first multicast group and the second base layer of the streaming data for the second multicast group.

15. A server useful in association with at least one client computer, said server coupled to said at least one client computer via a network, said server comprising:
- a networking unit configured to stream data, including a first base layer of said data, a first at least one enhancement layer of said data, a second base layer of said data and a second at least one enhancement layer of said data, to said at least one client computer, wherein said first at least one enhancement layer additive to said first base layer, said second at least one enhancement layer additive to said second base layer, and wherein said first base layer and said first at least one enhancement layer is streamed to said at least one client computer via a first multicast group, and said second base layer and a second at least one enhancement layer is streamed to said at least one client computer via a second multicast group.

16. The server of claim 15 wherein said first base layer is different from said second base layer, and said first at least one enhancement layer is different from said second at least one enhancement layer.

17. The server of claim 15 wherein said first base layer is similar to said second base layer, and said first at least one enhancement layer is different from said second at least one enhancement layer.

18. The server of claim 17 wherein said first at least one enhancement layer has a larger number of enhancement layers than said second at least one enhancement layer.

19. The server of claim 15 further comprising a receiver configured to receive feedback from said at least one client computer, said networking unit right-sizing said multimedia data in response to said feedback.

20. The server of claim 19 wherein said networking unit right-sizes said multimedia data by pruning said first at least one enhancement layer thereby eliminating a redundant enhancement layer of said first at least one enhancement layer.

21. The server of claim 19 wherein said networking unit right-sizes said multimedia data by growing said first at least one enhancement layer thereby adding an additional enhancement layer to said first at least one enhancement layer.

22. The server of claim 19 wherein said networking unit right-sizes said multimedia data by increasing the content of said first base layer and by eliminating a redundant enhancement layer of said first at least one enhancement layer.

23. The server of claim 19 wherein said networking unit right-sizes said multimedia data by decreasing the content of said first base layer and by adding an additional enhancement layer to said first at least one enhancement layer.

24. The server of claim 19 wherein said networking unit sending information about the content of said multimedia data to said at least one client computer via said first multicast group and said second multicast group.

25. The server of claim 15 wherein said first at least one enhancement layer are temporal enhancement layers.

26. The server of claim 15 wherein said first at least one enhancement layer are spatial enhancement layers.

27. The server of claim 26 wherein said spatial enhancement layers are generated using a Laplacian pyramid algorithm.

28. The server of claim 15 further comprising:
- a packetizer configured to package said data into a number of embedded video stream packets; and
- an encoder for producing said first base layer, said first at least one enhancement layer, said second base layer and said second at least one enhancement layer.

29. In a client computer coupled to a server via a network, a method for receiving data from said server, said data streamed via at least two multicast groups, said method comprising:
- receiving said data from said server via said at least two multicast groups;
- selecting a first suitable multicast group from said at least two multicast groups, said selected first multicast group associated with a first base layer and a first at least one enhancement layer of said data which best matches a target bandwidth of said client computer; and
- joining said selected first multicast group.

30. In a client computer coupled to a server via a network, a method for receiving data from said server, said data streamed via at least two multicast groups, said method comprising:
- receiving said data from said server via said at least two multicast groups;
- selecting a first suitable multicast group from said at least two multicast groups, said selected first multicast group associated with a first base layer and a first at least one enhancement layer of said data which best matches a target bandwidth of said client computer; and
- joining said selected first multicast group;
- detecting a change in a desired bandwidth of said client computer;
- selecting a second suitable multicast group from said at least two multicast groups, said selected second multicast group associated with a second base layer and a second at least one enhancement layer of said data which best matches the changed target bandwidth of said client computer; and
- joining said selected second multicast group.

31. In a server coupled to at least one client computer via a network, a computer readable medium having computer executable instructions comprising:
- streaming a first base layer and a first at least one enhancement layer of said data to said first multicast group, said first at least one enhancement layer additive to said first base layer; and
- streaming a second base layer and a second at least one enhancement layer of said data to said second multicast group, said second at least one enhancement layer additive to said second base layer.

32. The computer readable medium of claim 31 wherein said first base layer is different from said second base layer, and said first at least one enhancement layer is different from said second at least one enhancement layer.

33. The computer readable medium of claim 31 wherein said first base layer is similar to said second base layer, and said first at least one enhancement layer is different from said second at least one enhancement layer.

34. The computer readable medium of claim 33 wherein said first at least one enhancement layer has a larger number of enhancement layers than said second at least one enhancement layer.

35. The computer readable medium of claim 31 further comprising right-sizing said data in response to feedback from said at least one client computer.

36. The computer readable medium of claim 35 wherein said right-sizing includes pruning said first at least one enhancement layer by eliminating a redundant enhancement layer of said first at least one enhancement layer.

37. The computer readable medium of claim 35 wherein said right-sizing includes growing said first at least one enhancement layer by adding an additional enhancement layer to said first at least one enhancement layer.

38. The computer readable medium of claim 35 wherein said right-sizing includes:
   increasing the content of said first base layer; and
   eliminating a redundant enhancement layer of said first at least one enhancement layer.

39. The computer readable medium of claim 35 wherein said right-sizing includes:
   decreasing the content of said first base layer; and
   adding an additional enhancement layer to said first at least one enhancement layer.

40. The computer readable medium of claim 35 further comprising sending information about the content of said data to said at least one client computer via said first multicast group and said second multicast group.

41. The computer readable medium of claim 31 wherein said first at least one enhancement layer are temporal enhancement layers.

42. The computer readable medium of claim 31 wherein said first at least one enhancement layer are spatial enhancement layers.

43. The computer readable medium of claim 42 wherein said spatial enhancement layers are generated using a Laplacian pyramid algorithm.

44. In a client computer coupled to a server via a network, a computer readable medium having computer executable instructions for receiving data from said server, said data streamed via at least two multicast groups, said computer executable instructions comprising:
   receiving said data from said server via said at least two multicast groups;
   selecting a first suitable multicast group from said at least two multicast groups, said selected first multicast group associated with a first base layer and a first at least one enhancement layer of said data which best matches a target bandwidth of said client computer; and
   joining said selected first multicast group.

45. In a client computer coupled to a server via a network, a computer readable medium having computer executable instructions for receiving data from said server, said data streamed via at least two multicast groups, said computer executable instructions comprising:
   receiving said data from said server via said at least two multicast groups;
   selecting a first suitable multicast group from said at least two multicast groups, said selected first multicast group associated with a first base layer and a first at least one enhancement layer of said data which best matches a target bandwidth of said client computer; and
   joining said selected first multicast group;
      detecting a change in a desired bandwidth of said client computer;
      selecting a second suitable multicast group from said at least two multicast groups, said selected second multicast group associated with a second base layer and a second at least one enhancement layer of said data which best matches the changed target bandwidth of said client computer; and
   joining said selected second multicast group.

* * * * *